(12) United States Patent
Lee (10) Patent No.: US 7,151,650 B2
(45) Date of Patent: Dec. 19, 2006

(54) HEAD ASSEMBLY INCLUDING A VARIABLE DEVICE FOR ADJUSTING AN INCLINATION OF A SLIDER

(75) Inventor: Sang-hyub Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 164 days.

(21) Appl. No.: 10/361,635

(22) Filed: Feb. 11, 2003

(65) Prior Publication Data
US 2003/0151854 A1 Aug. 14, 2003

(30) Foreign Application Priority Data
Feb. 14, 2002 (KR) ................... 2002-7953

(51) Int. Cl.
*G11B 5/58* (2006.01)
(52) U.S. Cl. ................ 360/294.7; 360/294.4; 360/234.6
(58) Field of Classification Search ............ 360/294.7, 360/294.4, 234.4, 234.5, 234.6
See application file for complete search history.

(56) References Cited

U.S. PATENT DOCUMENTS

| | | | | |
|---|---|---|---|---|
| 5,313,352 A * | 5/1994 | Chikazawa et al. | ...... | 360/294.7 |
| 5,764,432 A * | 6/1998 | Kasahara | ............ | 360/75 |
| 5,943,189 A * | 8/1999 | Boutaghou et al. | ...... | 360/234.7 |
| 6,222,706 B1 * | 4/2001 | Stefansky et al. | ....... | 360/294.5 |
| 6,246,552 B1 * | 6/2001 | Soeno et al. | ............ | 360/294.4 |
| 6,297,936 B1 * | 10/2001 | Kant et al. | ............... | 360/294.4 |
| 6,359,758 B1 * | 3/2002 | Boutaghou | ............... | 360/294.4 |
| 6,381,104 B1 * | 4/2002 | Soeno et al. | ............ | 360/294.4 |
| 6,473,259 B1 * | 10/2002 | Kuo et al. | ..................... | 360/75 |
| 6,535,355 B1 * | 3/2003 | Boutaghou et al. | ...... | 360/245.7 |
| 6,611,399 B1 * | 8/2003 | Mei et al. | ................ | 360/234.7 |

(Continued)

FOREIGN PATENT DOCUMENTS

JP 1-213877 A * 8/1989

(Continued)

OTHER PUBLICATIONS

Japanese Patent Office Action for corresponding Japanese Patent Application No. 2003-032882 dated Jan. 24, 2006.

*Primary Examiner*—Jefferson Evans
(74) *Attorney, Agent, or Firm*—Staas & Halsey LLP (57) ABSTRACT

A head assembly includes a suspension coupled to an end portion of an actuator arm located on a base to rotate around a pivot shaft, a head slider installed at the suspension and having a head to record and/or read information on and/or from a recording medium, and a variable device located between the suspension and the head slider, wherein one side of the variable device is coupled to the suspension to adjust a flying height of the head slider by adjusting inclination of the head slider with respect to the suspension. The head assembly can be applied to a magnetic head assembly by using a magnetic head and a magnetic disk as the head and the recording medium, respectively. Thus, since the variable device can be fixedly coupled to the suspension during the assembly process of the head assembly or the manufacture of the suspension, the process of manufacture is considerably simplified compared to the conventional magnetic head assembly. Also, since the head assembly according to the present invention adopts a manner of directly controlling the flying height by adjusting the thickness of the variable device to adjust the pitch angle of the magnetic head slider, the flying height can be accurately and actively controlled so that a fast switch of the flying height is possible.

21 Claims, 6 Drawing Sheets

U.S. PATENT DOCUMENTS

6,690,543 B1 *  2/2004  Kurita et al. ............ 360/234.7
6,735,036 B1 *  5/2004  Olim ........................... 360/75
6,760,196 B1 *  7/2004  Niu et al. ................. 360/294.6
6,775,089 B1 *  8/2004  Bonin et al. ................... 360/75

FOREIGN PATENT DOCUMENTS

| | | |
|---|---|---|
| JP | 05-094682 | 4/1993 |
| JP | 5-151724 | 6/1993 |
| JP | 7-85621 | 9/1993 |
| JP | 07-029344 | 1/1995 |

* cited by examiner

HEAD ASSEMBLY INCLUDING A VARIABLE DEVICE FOR ADJUSTING AN INCLINATION OF A SLIDER

CROSS-REFERENCE TO RELATED APPLICATIONS

This application claims the benefit of Korean Patent Application No. 2002-7953 filed on Feb.14, 2002 in the Korean Intellectual Property Office, the disclosure of which is incorporated herein by reference.

BACKGROUND OF THE INVENTION

1. Field of the Invention

The present invention relates to a head assembly in which the flying height of a head slider varies according to the operational state, and a drive system adopting the same.

2. Description of the Related Art

A hard disk drive system has at least one magnetic head corresponding to a recording/reproducing surface of a hard disk that is rotating. The magnetic head writes or reads information by magnetizing or detecting a magnetic field of a surface of the hard disk drive.

In a hard disk drive system, read/write is performed in a swing arm driving manner in which a magnetic head assembly is installed on a base to pivot and a magnetic head installed at one end of the magnetic head assembly is moved to a desired position on a rotating disk as the magnetic head assembly pivots.

Figure 1:
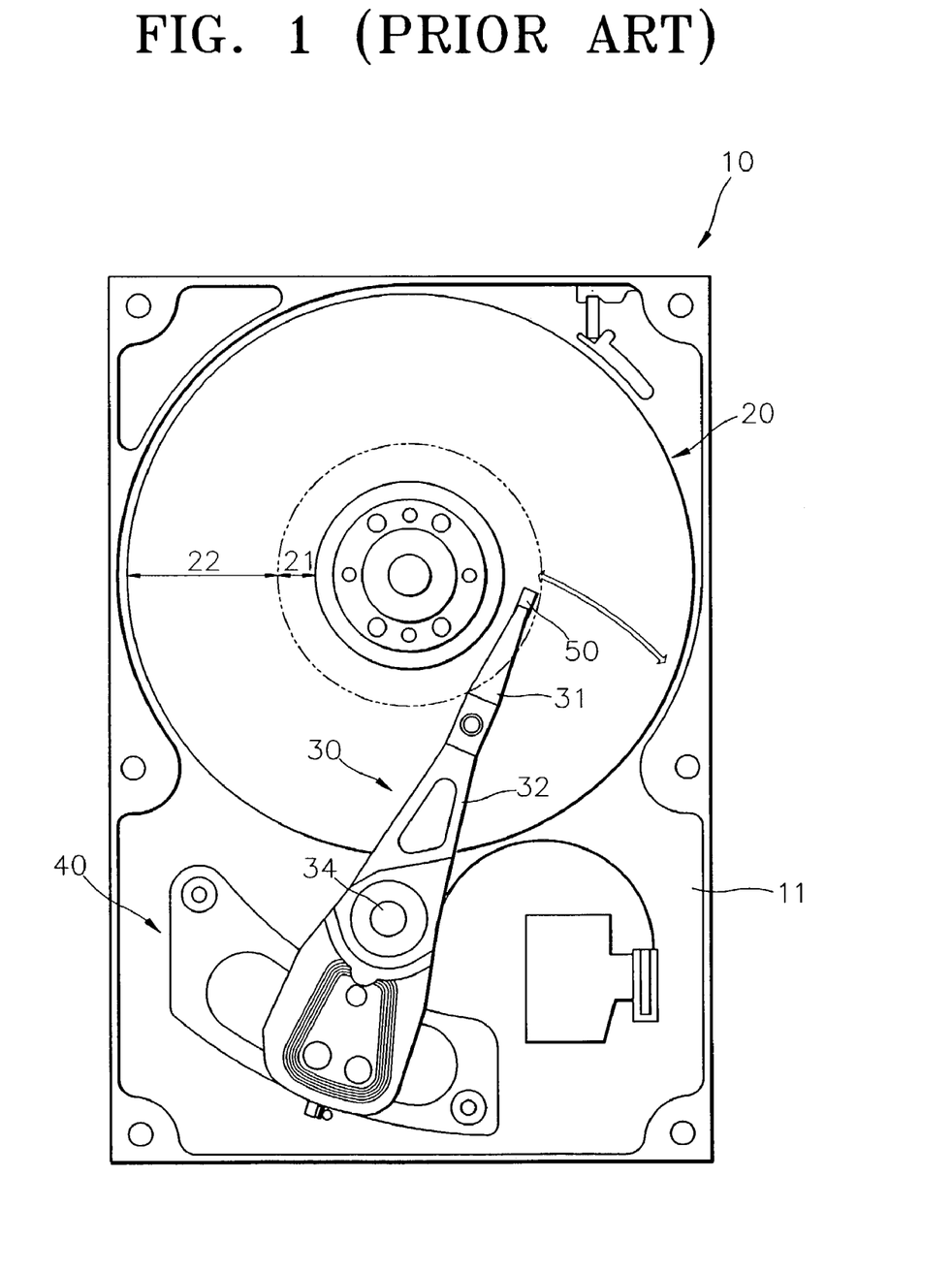
FIG. 1 is a plan view schematically illustrating the structure a typical hard disk drive system.

Referring to FIG. 1, a typical hard disk drive system 10 includes a hard disk 20 installed on a base 11 to rotate when a predetermined information is recorded, and a magnetic head transferring apparatus to transfer a magnetic head 50 to a desired track position on the hard disk 20 to write and read information of the hard disk 20. Here, the hard disk 20 is divided into a recording area 22 where information is recorded and a parking area 21 where the magnetic head 50 is parked when the hard disk 20 stops rotating.

The magnetic head transfer apparatus includes a magnetic head assembly 30 installed to pivot around a pivot shaft 30 provided on the base 11 and having the magnetic head 50 mounted thereon, and a driving portion 40 to pivot the magnetic head assembly 30 using an electromagnetic force.

The magnetic head assembly 30 includes a suspension 31 coupled to an end portion of an actuator arm 32 rotatably coupled to the pivot shaft 34, and a magnetic head slider 50 installed at the suspension 31 and having a magnetic head (not shown) for reading/writing information on/from the hard disk 20.

The magnetic head slider 50 is biased toward the hard disk 20 by the suspension 31. When the hard disk 20 begins to rotate, the magnetic head slider 50 flies by being lifted by an air dynamic pressure generated by the rotation of the hard disk 20. Here, the height at which the magnetic head slider 50 flies in a lifted state (hereinafter, referred to as the "flying height (FH)") is determined by a gram load of the suspension 31 and lift by air flow according to the rotation of the hard disk 20. The flying height is a gap between a surface of the hard disk 20 and a read sensor, that is, a magnetoresistance head, provided at the tip end of the magnetic head slider 50 when the magnetic head slider 50 flies by being lifted with respect to the hard disk 20 during the rotation of the hard disk 20. The gram load refers to a force exerted by the suspension 31. A high gram load corresponds to a stiff suspension.

Figure 2:
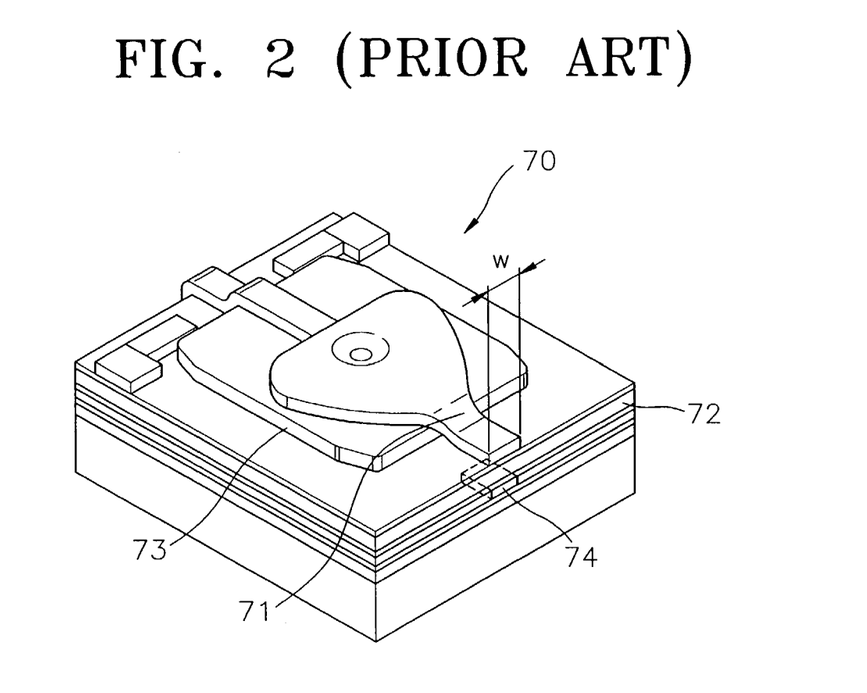
FIG. 2 is an enlarged perspective view illustrating the structure of a typical magnetic head.

FIG. 2 shows a structure of a typical magnetic head 70. As shown in the drawing, the magnetic head 70 includes a magnetoresistance head 74 for reproduction, and an induction recording head for recording. The magnetoresistance head 74 detects and reads out a magnetic signal recorded in the hard disk 20. The induction recording head for recording a desired signal in the hard disk 20 includes a top pole 71 and a bottom pole 72 for forming a leakage magnet toward the hard disk 20, and a recording coil 73 for generating a magnetic field according to the supply of current.

Recently, to increase capacity of the hard disk 20, a track per inch (TPI) is increased while the width W of a track is decreased.

To reduce the width of a track of the hard disk 20, the width of a write head to write a magnetic signal on the track of the hard disk 20 should be reduced accordingly. Also, the flying height of the magnetic head 70 needs to be lowered to read out a magnetic field written on a track having a relatively small size.

When the flying height of the magnetic head 70 is lowered, the gap between the magnetic head slider 50 and the hard disk 20 decreases so that the magnetic head slider 50 may actually contact (be interfered by) the hard disk 20, moving the magnetic head slider 50 to another track or the parking area 21 of the hard disk 20. As a result, the magnetic head 70 or the hard disk 20 can be damaged.

Thus, it is necessary to reduce interference between the magnetic head slider 50 and the hard disk 20 by increasing the flying height of the magnetic head 70 according to the operational state, for example, when the magnetic head slider 50 is moved to another track or the parking area 21 of the hard disk 20.

Figure 3:
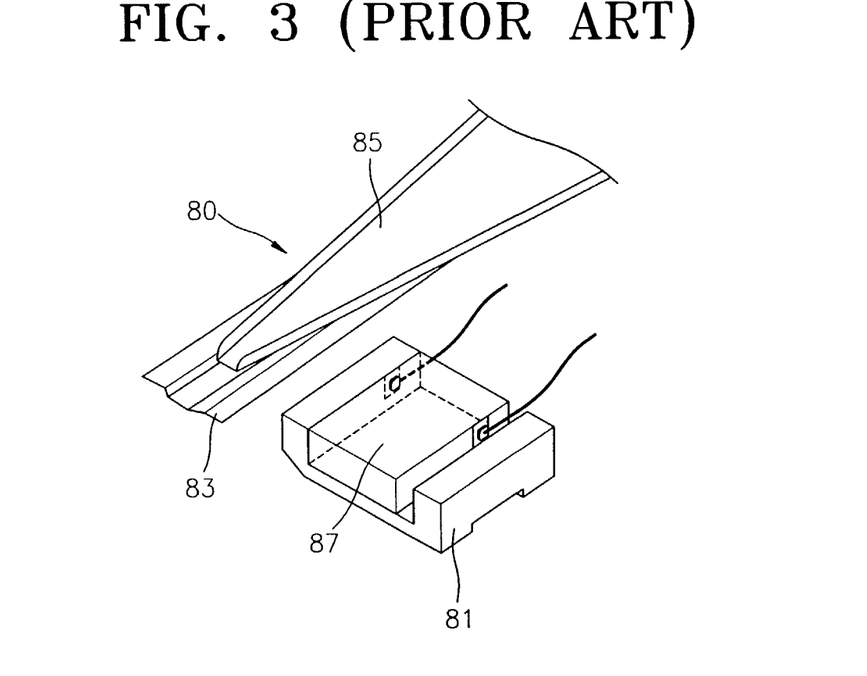
FIG. 3 is a perspective view schematically illustrating an example of a conventional magnetic head assembly disclosed in Japanese Patent Publication No. hei 7-85621.

FIG. 3 is a perspective view illustrating an example of a conventional magnetic head assembly disclosed by Japanese Patent Publication No. 7-85621 to reduce interference between the magnetic head slider and the hard disk.

Referring to the drawing, a conventional magnetic head slider 80 includes a magnetic head slider 81 having a magnetic head, a flexible member 83 for supporting the magnetic head slider 81, a support spring structure 85 coupled to the flexible member 83 and applying a load weight to the magnetic head slider 81, and a piezoelectric element 87 installed at the magnetic head slider 81 to change a weight point of the magnetic head slider 81. The piezoelectric element 87 is installed to be capable of extending inside the magnetic head slider 81.

Figure 4:
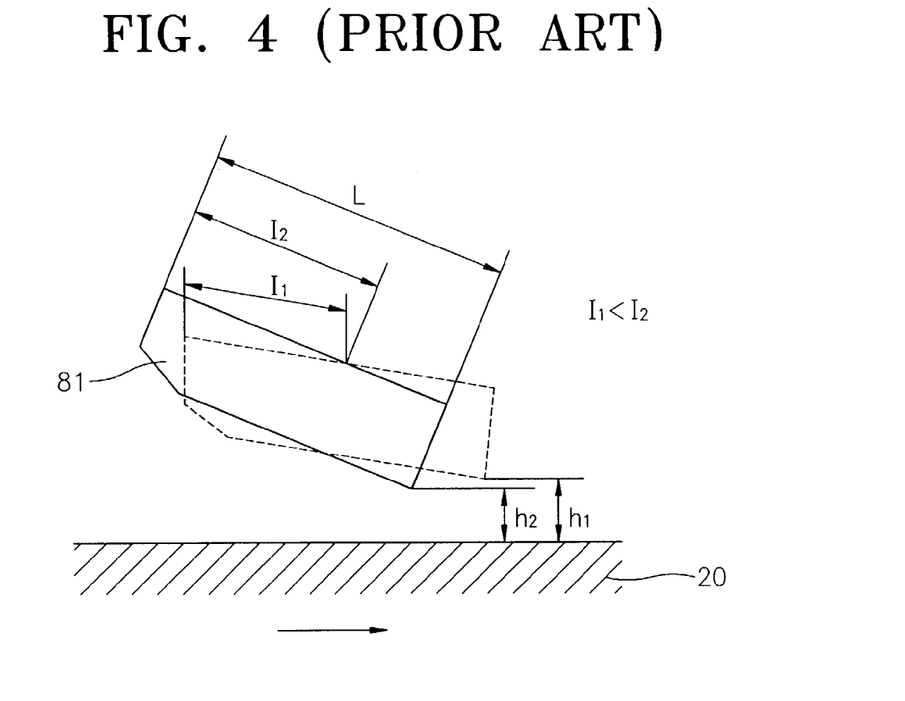
FIG. 4 is a view illustrating a change in the flying height of the magnetic head slider according to a change in the weight point of the magnetic head slider in the magnetic head assembly of FIG. 3.

Thus, as a voltage is applied to the piezoelectric element 87, the piezoelectric element 87 is extended. Accordingly, the weight point of the magnetic head slider 81 is changed. FIG. 4 shows a change in the flying height of the magnetic head slider 81 according to a change in the weight point of the magnetic head slider 81. In FIG. 4, L denotes the length of the magnetic head slider 81, $I_1$ and $I_2$ denote the distances from one side of the magnetic head slider 81 to the weight point in a lengthwise direction. Assuming that when the weight point is located at $I_1$ the flying height of the magnetic head slider 81 with respect to the hard disk 20 is $h_1$, and when the weight point is located at a position separated by the distance $I_2$ from one side of the magnetic head slider 81 in the lengthwise direction wherein $I_2$ is greater than the distance $I_1$, the flying height $h_2$ is lower than $h_1$.

Thus, the conventional magnetic head assembly 80 can adjust the flying height of the magnetic head slider 81 by applying a voltage to the piezoelectric element 87.

However, in the above-described conventional magnetic head assembly 80, since a process of taking out part of the magnetic head slider 81 to install the piezoelectric element 87 is needed, the manufacturing process is complicated and uniform performance cannot be guaranteed during mass production of the magnetic head assembly 80.

Also, since the conventional magnetic head assembly 80 uses an indirect control method in which the flying height is adjusted by changing the inclination of the magnetic head slider 81 generated when the weight point of the magnetic head slider 81 changes, an accurate control of the flying height is difficult.

Also, since the conventional magnetic head assembly 80 needs a great change in the volume of the piezoelectric element 87 to change the weight point of the magnetic head slider 81, a control sensitivity in changing the flying height is lowered so that a fine control of the flying height is difficult. Furthermore, changing the flying height of the magnetic head slider 81 to switch an operation mode takes a long time so that a quick control is not possible.

SUMMARY OF THE INVENTION

To solve the above and/or other problems, the present invention provides a head assembly in which a manufacturing process is simplified are provided, and a drive system adopting the same.

According to one aspect of the present invention, a head assembly comprises a suspension coupled to an end portion of an actuator arm provided on a base to rotate around a pivot shaft, a head slider installed at the suspension and having a head to record and/or read information on and/or from a recording medium, and a variable device provided between the suspension and the head slider in a state in which one side of the variable device is coupled to the suspension to adjust a flying height of the head slider by adjusting inclination of the head slider with respect to the suspension.

According to another aspect of the present invention, a drive system includes a head assembly to record and/or read information on and/or from a recording medium, the head assembly comprising a suspension coupled to an end portion of an actuator arm provided on a base to rotate around a pivot shaft, a head slider installed at the suspension and having a head to record and/or read information on and/or from a recording medium, and a variable device provided between the suspension and the head slider in a state in which one side of the variable device is coupled to the suspension to adjust a flying height of the head slider by adjusting inclination of the head slider with respect to the suspension.

The head is a magnetic head and the recording medium is a magnetic disk. The suspension is a load beam having a gram load. The head is installed at the suspension through a flexure, and the variable device is disposed between the flexure and the suspension. The variable device is provided to adjust at least one of a pitch angle and a rolling angle made by the head with respect to the recording medium. The variable device is a piezoelectric actuator having a piezoelectric material with a thickness that varies by the application of electric power.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A magnetic head assembly according to an embodiment of the present invention is applied to a magnetic disk drive system such as a hard disk drive system. Hereinafter, an example of applying a magnetic head assembly according to an embodiment of the present invention to a hard disk drive system is described. Here, the same reference numerals indicate the same elements.

Figure 5:
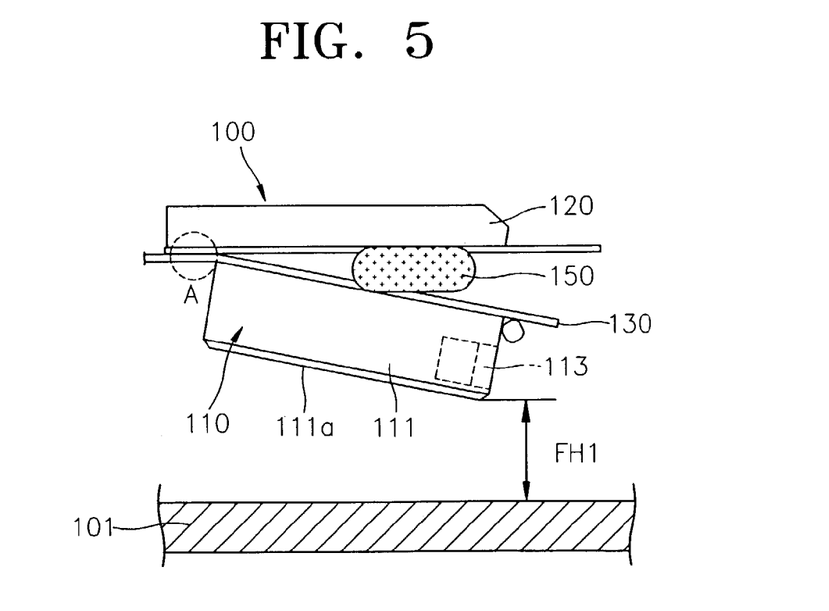
FIG. 5 is a view schematically illustrating major portions of a magnetic head assembly according to an embodiment of the present invention.
Figure 6:
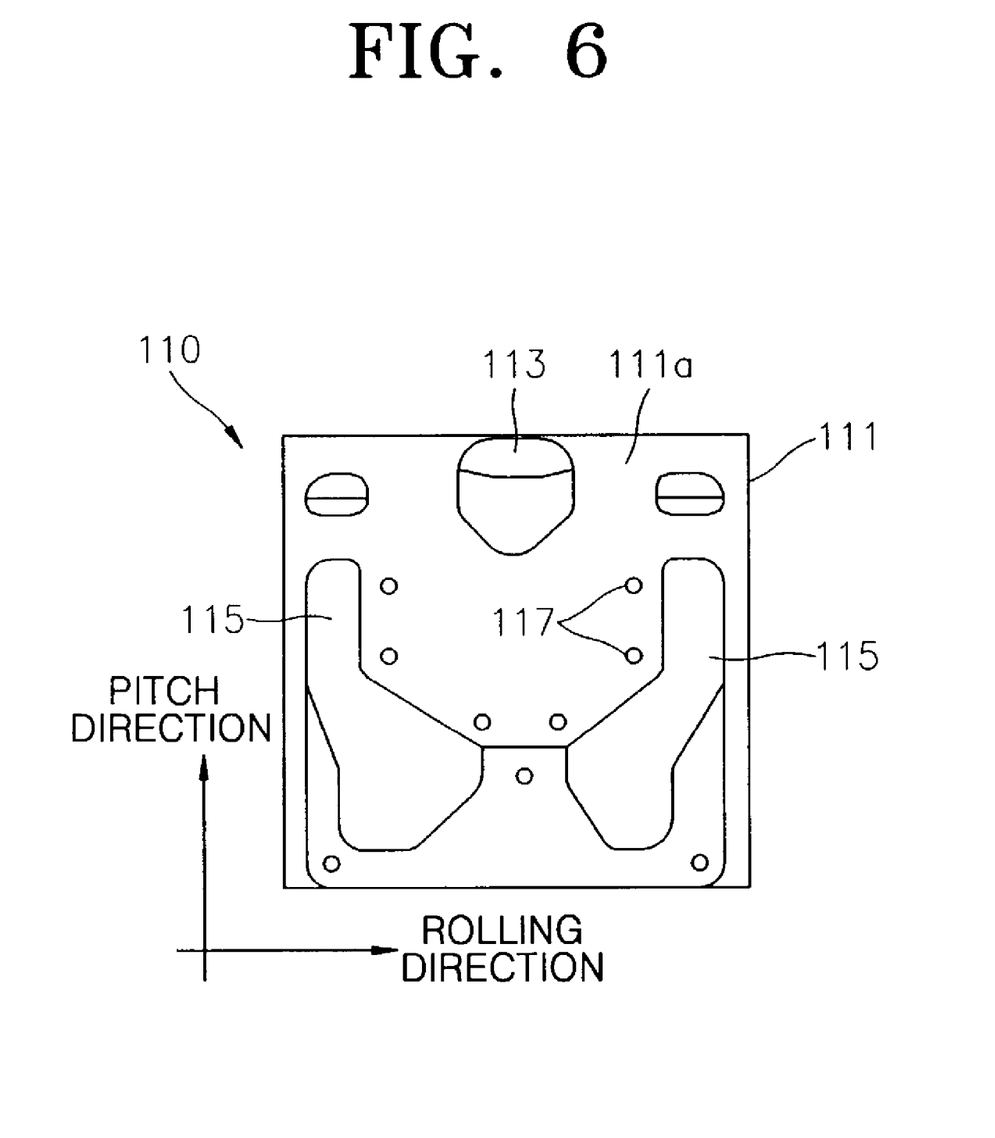
FIG. 6 is a plan view illustrating an embodiment of a magnetic head slider that can be adopted in the magnetic head assembly according to the present invention.

Referring to FIGS. 5 and 6, a magnetic head assembly 100 according to the present invention includes a suspension 120 coupled to an end portion of the actuator arm 32 to bias a magnetic head slider 110 toward a magnetic disk 101, a magnetic head slider 110 installed at the suspension 120, and a variable device 150 provided between the magnetic head slider 110 and the suspension 120.

The suspension 120 may be formed by using a plate material such as a stainless steel. The suspension 120 is a load beam having a gram load. The gram load of the suspension 120 has influence on the flying height of the magnetic head slider 110 together with a lift by an air flow generated as the magnetic disk 101 (for example, a hard disk), which is a recording medium, rotates and negative pressure is generated by an ABS (air bearing surface) pad design of a magnetic head, which will be described later. The gram load of the suspension 120 is designed such that a flight of the magnetic head slider 110 can be stably maintained.

The magnetic head slider 110, as shown in FIG. 6, includes a slider 111 functioning as a substrate, and a magnetic head 113 located at a leading end portion of a surface (hereinafter, referred to as a slider surface 111a) facing the magnetic disk 101 of the slider 111.

An ABS 115 for generating negative pressure to stably maintain the flying height of the magnetic head slider 110 during the rotation of the magnetic disk 101 is preferably provided at the slider surface 111a of the magnetic head slider 110.

Also, a plurality of pads 117 to make the slider surface 111a have a point contact with the surface of the magnetic disk 101 is provided at the slider surface 111a. The pads 117 can be formed of DLC (diamond-like carbon). The pads 117 facilitate separation between a slippery surface of the magnetic disk 101 and the slider surface 111a.

Referring to FIG. 5, the magnetic head assembly 100 according to an embodiment of the present invention may have a structure in which the magnetic head slider 110 is installed at the suspension 120 via a flexure 130. The flexure 130 is coupled to the suspension 120 by using at least one spot welding. Here, the flexure 130 can be coupled to the suspension 120 by other coupling techniques, for example, an adhesive.

A position A, where the flexure 130 is coupled to the suspension 120 by a spot welding, for example, is as close as possible to a position on the flexure 130 where the magnetic slider 110 is installed, without interfering with the adjustment of inclination of the magnetic head slider 110 installed at the flexure 130 according to a change in the thickness of the variable device 150. When the flexure 130 is coupled to the suspension 120 as above, the flying height can be greatly changed by slightly changing an inclination angle made by the magnetic head slider 110 and the magnetic disk 101. For example, a pitch angle may be changed a small amount to obtain a desirable low flying height so that a stable flying characteristic can be obtained.

Here, a lead (not shown) is provided at the flexure 130, which functions as a wire to apply a recording signal to the magnetic head 113 provided at the leading end portion of the slider surface 111a of the magnetic head slider 113 and transmits a signal detected by the magnetic head 113.

A head assembly that has the suspension 120 with a gram load, in which the magnetic head slider 110 is installed at the suspension 120 via the flexure 130, like the magnetic head assembly 100 according to an embodiment of the present invention, is referred to as a head gimbal assembly (HGA).

The variable device 150 having one end thereof fixed to the suspension 120 is located between the suspension 120 and the magnetic head slider 110. In particular, when the magnetic head assembly 100, as shown in FIG. 5, includes the flexure 130, and the magnetic head slider 110 is installed at the suspension 120 via the flexure 130, the variable device 150 is located between the suspension 120 and the flexure 130.

A piezoelectric actuator formed of piezoelectric material whose thickness varies according to an applied voltage can be used as the variable device 150.

In the meantime, in a general head gimbal assembly, a dimple is formed to guide prevention of contact between a flexure portion where a magnetic head slider is attached and a suspension. The dimple is formed by pressing a stainless steel plate that forms the suspension, causing the stainless steel plate to protrude.

Thus, in the magnetic head assembly 100, the variable device 150 is located at a predetermined position on the side of the suspension 120 facing the magnetic head slider 110, in particular, at a position where the dimple is formed on the suspension in a typical head gimbal assembly, so that the variable device 150 functions as the dimple does in the typical head gimbal assembly.

Figure 7:
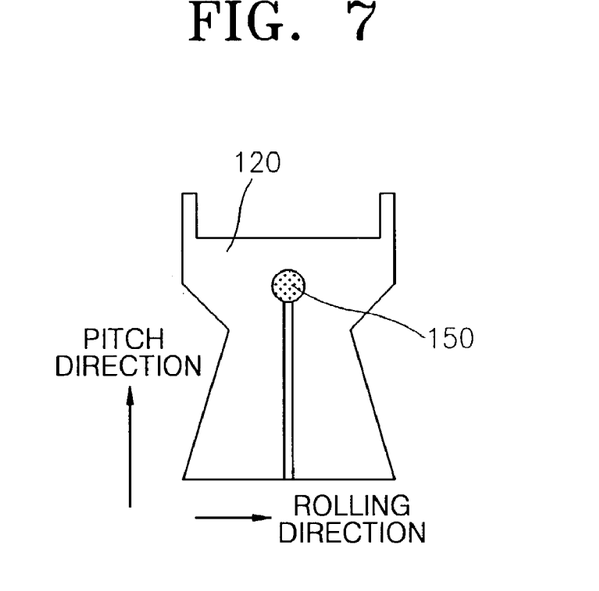
FIG. 7 is a view illustrating an embodiment of a variable device in the magnetic head assembly according to the present invention.

The magnetic head assembly 100 according to an embodiment of the present invention, as shown in FIG. 7, may include one variable device 150 at the position where the dimple is formed. Here, as the electric power is applied to the variable device 150, the inclination of the magnetic head slider 110 with respect to the suspension 120 is adjusted. Accordingly, a pitch angle made by the magnetic head slider 110 with respect to the magnetic disk 101 is adjusted. Assuming that a pitch directional axis is approximately parallel to a rotation direction (a tangential direction of a track) of the magnetic disk 101, the pitch angle is an angle made by the magnetic disk 101 and the magnetic head slider 110 with respect to the rotational direction of the magnetic disk 101.

Since the magnetic head assembly 100 according to an embodiment of the present invention directly adjusts the flying height by controlling the pitch angle of the magnetic head slider 110 according to a change in the thickness of the variable device 150, the flying height can be accurately, finely, and actively controlled. In addition, the flying height can be quickly changed so that an operational mode switch time is shortened.

Figure 8:
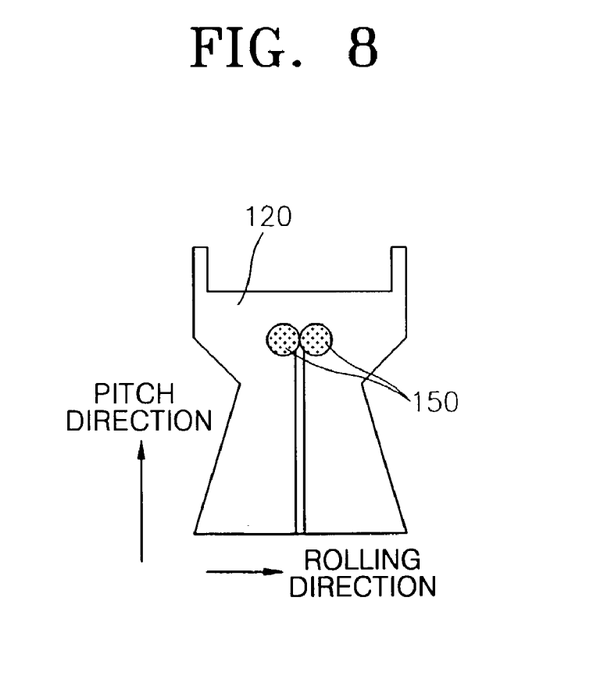
FIG. 8 is a view illustrating another embodiment of the variable device in the magnetic head assembly according to the present invention.

Referring to FIG. 8, a magnetic head assembly 100 according to another embodiment of the present invention includes a plurality of variable devices 150 arranged in line approximately in a rolling direction. By making the amounts of deformation of the variable devices 150 equal, the pitch angle made by the magnetic head slider 110 with respect to the magnetic disk 101 can be adjusted. When the amounts of deformation of the variable devices 150 are different, the rolling angle made by the magnetic head slider 110 with respect to the magnetic disk 101 can be adjusted. The rolling direction is perpendicular to the pitch direction (which is approximately a radial direction of the magnetic disk 101). The rolling angle is an angle made by the magnetic disk 101 and the magnetic head slider 110 with respect to the rolling direction.

In the magnetic head assembly 100 according to another embodiment of the present invention, since an active control of not only the pitch angle, but also the rolling angle is possible, an error in the pitch angle/rolling angle due to a crown/camber error generated by the manufacturing process of the magnetic head slider 110 can be actively corrected.

Also, according to the magnetic head assembly 100 according to another embodiment of the present invention, since the pitch angle, as well as the rolling angle, can be adjusted, a superior flying feature can be obtained during a seek operation.

The operational feature of the magnetic head slider 110 during flying is determined by the design of the ABS 115 formed on the slider surface 111a of the magnetic head slider 110, the curved surface (crown and camber) of the ABS 115, the pitch angle, and the rolling angle. In particular, during the seek operation, a rolling feature is important. In an embodiment, since the rolling angle can be changed, the seek operation can be performed at an optimal rolling angle.

As described above, in the magnetic head assembly 100, since the variable device 150, such as a piezoelectric actuator whose volume or thickness in a predetermined direction varies according to the input of power, is attached where the dimple is generally located, instead of using the dimple formed by a mechanical process at a position between the suspension 120 (load beam) and the flexure 130, the flying height is changed by adjusting the pitch angle by using the variable device 150. Accordingly, the flying height is adjusted according to the operation state of the hard disk drive system. Here, the variable device 150 serves as the dimple.

Figure 9A:
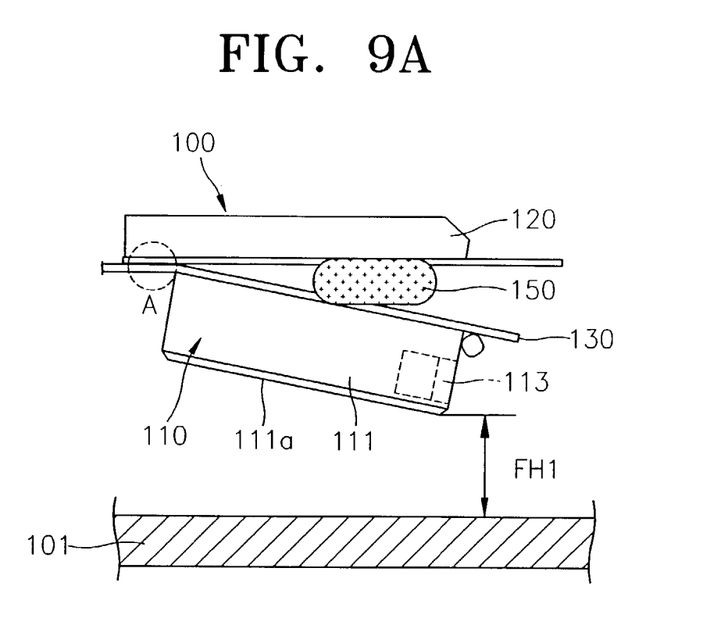
FIGS. 9A and 9B are views illustrating a change in the flying height according to a change in the thickness of the variable device in the magnetic head assembly according to an embodiment of the present invention.

The magnetic head assembly 100 according to an embodiment of the present invention operates as follows. For example, in a hard disk drive system adopting the magnetic head assembly 100 according to an embodiment of the present invention, while track following, moving to other track, and parking operations other than magnetic recording or reading actions are performed, the variable device 150, as shown in FIG. 9A, is maintained in a contracted state. In this case, since an angle made by the magnetic head slider 110 with respect to the hard disk 101, for example, the pitch angle, is small, the flying height FH1 of the magnetic head assembly 100 according to an embodiment of the present invention increases.

Figure 9B:
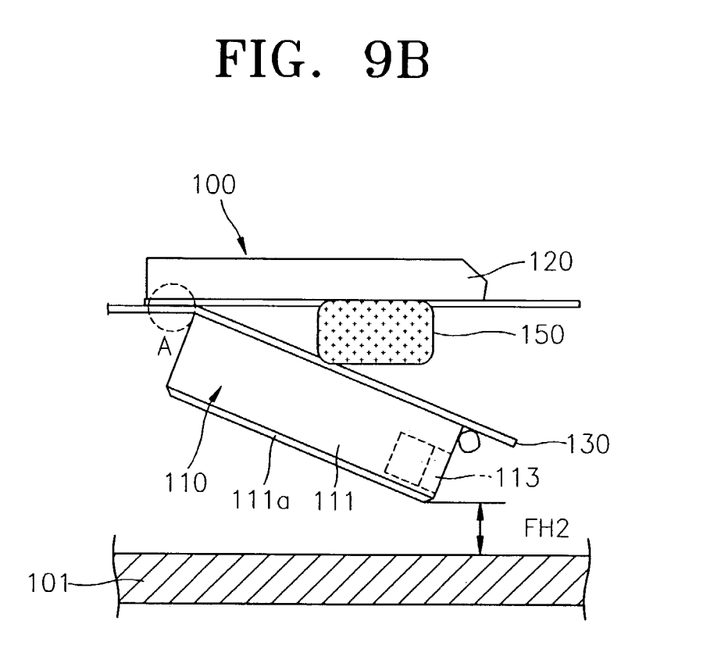

During the operation of recording the information on, and reading information from, the magnetic disk 101, electric power is applied to the variable device 150 to increase the thickness thereof. Accordingly, as shown in FIG. 9B, as the thickness of the variable device 150 coupled to the suspension 120 increases, the variable device 150 presses the magnetic head slider 110 toward the magnetic disk 101. Since the magnetic head slider 110 is installed at the flexure 130, and the flexure 130 is coupled to the suspension 120, as the thickness of the variable device 150 increases, an inclination angle made by the magnetic head slider 110 with respect to the suspension 120 increases. Thus, as the angle made by the magnetic head slider 110 with respect to the magnetic disk 101, for example, a pitch angle, increases, the flying height of the magnetic head assembly 100 according to an embodiment of the present invention is lowered.

That is, the magnetic head assembly 100 according to an embodiment of the present invention is operated at a lower flying height FH2 while the magnetic head assembly 100 records or reads information on or from the magnetic disk 101.

Accordingly, in the magnetic head assembly 100 according to an embodiment of the present invention, the flying height is raised in a state other than read/write operations by adjusting the pitch angle of the magnetic head slider 110 by using the variable device 150 without moving the whole part of the suspension 120 or the magnetic head slider 110.

Thus, since a high flying height can be maintained during an operation other than read/write operations, interference between the magnetic head slider 110 and the magnetic disk 101 can be prevented, and scratches by the magnetic head 113 and a frequency of generation of defects of the magnetic disk 101 due to the piezoelectric element can be reduced.

In particular, as described above, in the magnetic head assembly 100 according to an embodiment of the present invention, since the flying height can be switched to a desired height by adjusting the pitch angle between the magnetic head slider 110 and the magnetic disk 101, the read/write operations can be performed at a flying height less than or equal to 0.5μ inch (12.7 nm) which is generally required for reading/writing information with respect to a hard disk having a high density recording capacity. Here, since moving the magnetic head assembly 100 at a high flying height is possible during the operation other than read/write operations, the interference between the magnetic head slider 110 and the magnetic disk 101 can be prevented. Thus, damage to the magnetic head 113 or the magnetic disk 101 can be prevented.

Also, the magnetic head assembly 100 according to an embodiment of the present invention can be applied to a hard disk drive system having a hard disk requiring a flying height less than or equal to 0.5μ inch.

As it is known in the field of technology to which the present invention pertains, when the pitch angle is small, the magnetic head slider can maintain a stable flying state. However, when the pitch angle increases, stiffness of the magnetic head slider deteriorates so that flying becomes unstable.

The magnetic head assembly 100 according to an embodiment of the present invention, as shown in FIG. 5, has a structure in which the flexure 130 and the suspension 120 are coupled to each other at the position A, as close as possible to the end portion of the flexure 130 without interfering with the adjustment of inclination of the magnetic head slider 110 installed at the flexure 130. The flying height varies by directly changing the inclination of the magnetic head slider 110 with respect to the suspension 120 to change the thickness of the variable device 150.

Thus, the magnetic head assembly 100 according to the present invention can obtain a low flying height from a change in the pitch angle which is much less than that in the typical head gimbal assembly.

Also, an interface margin between the magnetic head 113 and the magnetic disk 101 can be obtained at a sufficiently high altitude by using the magnetic head assembly 100 according to the present invention. That is, assuming that the flying height of a magnetic head assembly for a magnetic disk having a recording capacity of 40 G/P is 0.5μ inch, since the flying height of the magnetic head assembly is reduced by about 40% at the altitude of 10,000 feet (about 3000 m high from the ground), an error may occur due to the interference between the magnetic head assembly and the magnetic disk. In particular, since the flying height of a magnetic head assembly for a magnetic disk having a recording capacity of 40 G/P or more, for example, 60 G/P or 80 G/P, is reduced to 0.4 or 0.35μ inch, as the recording capacity increases, a more serious problem may occur at a high altitude. In the magnetic head assembly 100 according to an embodiment of the present invention, however, since the flying height of the magnetic head assembly 100 can be actively varied, the interface margin between the magnetic head 113 and the magnetic disk 101 can be sufficiently obtained at a high altitude.

Also, since the flying height of the magnetic head assembly 100 according to the present invention can be sufficiently lowered by slightly adjusting the pitch angle of the magnetic head slider 110, stability and stiffness features of the magnetic head slider 110 are superior.

Furthermore, since the magnetic head assembly 100 according to an embodiment of the present invention has a relatively great pitch angle during the read/write operations, a fast take-off velocity can be obtained. Since a parking operation is performed at a high flying height, reliable parking is available.

Thus, the hard disk drive system adopting the magnetic head assembly 100 according to the present invention can secure reliability.

In the above description, although the present invention is described and drawn as being applied to a magnetic head assembly adopting a magnetic recording method and to a magnetic disk drive system such as a hard disk drive system adopting the above magnetic head assembly, the present invention is not limited to the above embodiments. A variety of modifications and applied examples are obviously possible. That is, the technology of the present invention can be applied to a head assembly using a recording method other than the magnetic recording method and to a disk drive system adopting the above head assembly.

As described above, since the variable device can be fixedly coupled to the suspension during the assembly process of the head assembly or the manufacture of the suspension, the process of manufacture is considerably simplified compared to the conventional magnetic head assembly.

Also, since the head assembly according to the present invention adopts a manner of directly controlling the flying height by adjusting the pitch angle of the magnetic head slider to change the thickness of the variable device, the flying height can be accurately and actively controlled so that a fast switch of the flying height is possible.

Although a few embodiments of the present invention have been shown and described, it would be appreciated by those skilled in the art that changes maybe made in these embodiments without departing from the principles and spirit of the invention, the scope of which defined in the claims and their equivalents.

What is claimed is:

1. A head assembly to use with a recording medium, comprising:
   a suspension coupled to an end portion of an actuator arm provided on a base to rotate around a pivot shaft;
   a head slider installed at the suspension and having a head to record and/or read information on and/or from the recording medium;
   a variable device located between the suspension and the head slider, wherein one side of the variable device is coupled to the suspension to adjust a flying height of the head slider by adjusting at least one of a pitch angle and a rolling angle made by the head with respect to the recording medium, wherein the variable device is a piezoelectric actuator having a piezoelectric material with a thickness that varies by the application of electric power; and
   a flexure, wherein the head is installed at the suspension using the flexure, and the variable device is disposed between the flexure and the suspension,
   wherein the variable device is formed to guide prevention of contact between the flexure where the head slider is attached and the suspension.

2. The head assembly as claimed in claim 1, wherein the head is a magnetic head and the recording medium is a magnetic disk.

3. The head assembly as claimed in claim 2, wherein the suspension is a load beam having a gram load.

4. The head assembly as claimed in claim 1, wherein the suspension is a load beam having a gram load.

5. The head assembly as claimed in claim 1, wherein the head is installed at a leading end portion of a surface of the head slider facing the recoding medium.

6. A drive system including a head assembly to record and/or read information on and/or from a recording medium, the head assembly comprising:
   a recording medium;
   a head assemblage for use with the recording medium;
   a suspension coupled to an end portion of an actuator arm located on a base to rotate around a pivot shaft;
   a head slider installed at the suspension and having a head to record and/or read information on and/or from the recording medium;
   a variable device located between the suspension and the head slider, wherein one side of the variable device is coupled to the suspension to adjust a flying height of the head slider by adjusting at least one of a pitch angle and a rolling angle made by the head with respect to the recording medium, and wherein the variable device is a piezoelectric actuator having a piezoelectric material with a thickness that varies by the application of electric power; and
   a flexure, wherein the head is installed at the suspension using the flexure, and the variable device is disposed between the flexure and the suspension,
   wherein the variable device is formed to guide prevention of contact between the flexure where the head slider is attached and the suspension.

7. The drive system as claimed in claim 6, wherein the head is a magnetic head, and the recording medium is a magnetic disk.

8. The head assembly as claimed in claim 6, wherein the suspension is a load beam having a gram load.

9. A head assembly comprising:
   a suspension on an end portion of an actuator arm that rotates around a pivot shaft;
   a head slider on the suspension, having a read/write head;
   a variable device coupled to the suspension to adjust an inclination of the read/write head relative to a recording medium by adjusting at least one of a pitch angle and a rolling angle made by the read/write head with respect to a recording medium, wherein the variable device is a piezoelectric actuator having a piezoelectric material with a thickness that varies by the application of electric power; and
   a flexure, wherein the read/write head is installed at the suspension using the flexure, and the variable device is disposed between the flexure and the suspension,
   wherein the variable device is formed to guide prevention of contact between the flexure where the head slider is attached and the suspension.

10. The head assembly as claimed in claim 9, usable with a magnetic disk recording medium, wherein the read/write head is a magnetic head and performs read/write functions on the magnetic disk recording medium.

11. The head assembly as claimed in claim 10, wherein the suspension is a load beam having a gram load.

12. The head assembly as claimed in claim 9, wherein the suspension is a load beam having a gram load.

13. The head assembly as claimed in claim 9, wherein the read/write head is installed at a leading end portion of a surface of the head slider facing the recording medium.

14. A head assembly comprising:
   a suspension coupled to an end portion of an actuator arm provided on a base to rotate around a pivot shaft;
   a variable device controlled, adjustable-inclination head slider having a read/write head, wherein the variable device is a piezoelectric actuator having a piezoelectric material with a thickness that varies by the application of electric power, wherein the variable device is coupled to the suspension to adjust at least one of a pitch angle and a rolling angle made by the head with respect to a recording medium; and
   a flexure, wherein the read/write head is installed at the suspension using the flexure, and the variable device is disposed between the flexure and the suspension,
   wherein the variable device is formed to guide prevention of contact between the flexure where the head slider is attached and the suspension.

15. The head assembly as claimed in claim 14, usable with a magnetic disk recording medium, wherein the read/write head is a magnetic head that records on the magnetic disk recording medium.

16. The head assembly as claimed in claim 15, wherein the suspension is a load beam having a gram load.

17. The head assembly as claimed in claim 15, wherein the read/write head is installed at a leading end portion of a surface of the head slider facing the recording medium.

18. The head assembly as claimed in claim 14, wherein the suspension is a load beam having a gram load.

19. A head assembly to use with a recording medium, comprising:
- a suspension coupled to an end portion of an actuator arm provided on a base to rotate around a pivot shaft;
- a head slider installed at the suspension and having a head to record and/or read information on and/or from the recording medium;
- a variable device located between the suspension and the head slider, wherein one side of the variable device is coupled to the suspension to adjust a pitch angle of the magnetic slider without moving the whole part of the suspension or the magnetic head slider and to adjust a rolling angle made by the head slider with respect to the recording medium, wherein the variable device is a piezoelectric actuator having a piezoelectric material with a thickness that varies by the application of electric power; and
- a flexure, wherein the head is installed at the suspension using the flexure, and the variable device is disposed between the flexure and the suspension,
- wherein the variable device is formed to guide prevention of contact between the flexure where the head slider is attached and the suspension.

20. A head assembly to use with a recording medium, comprising:
- a suspension coupled to an end portion of an actuator arm provided on a base to rotate around a pivot shaft;
- a head slider installed at the suspension and having a head to record and/or read information on and/or from the recording medium;
- a plurality of deformable variable devices arranged in a rolling direction perpendicular to a pitch direction, to adjust a pitch angle of the head slider relative to a magnetic disk and to adjust a rolling angle made by the head slider with respect to the recording medium, wherein the deformable variable devices are piezoelectric actuators having a piezoelectric material with a thickness that varies by the application of electric power; and
- a flexure, wherein the head is installed at the suspension using the flexure, and the variable devices are disposed between the flexure and the suspension,
- wherein the plurality of variable devices are formed to guide prevention of contact between the flexure where the head slider is attached and the suspension.

21. A head assembly to use with a recording medium, comprising:
- a head slider installed at a flexure on a suspension arm of a reading/writing assembly having a magnetic head; and
- a piezoelectric actuator having a piezoelectric material with a thickness that varies by the application of electric power, arranged to adjust at least one of a pitch angle and a rolling angle made by the magnetic head with respect to the recording medium,
- wherein the piezoelectric actuator is formed to guide prevention of contact between the flexure where the head slider is attached and the suspension.

* * * * *